United States Patent
Zhu et al.

(10) Patent No.: US 11,137,631 B2
(45) Date of Patent: Oct. 5, 2021

(54) DISPLAY PANEL, FABRICATION METHOD THEREOF AND DISPLAY DEVICE

(71) Applicant: BOE TECHNOLOGY GROUP CO., LTD., Beijing (CN)

(72) Inventors: Xiaoyan Zhu, Beijing (CN); Hua Huang, Beijing (CN); Changhan Xie, Beijing (CN); Weikang Xiao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 746 days.

(21) Appl. No.: 15/989,388

(22) Filed: May 25, 2018

(65) Prior Publication Data
US 2019/0094589 A1    Mar. 28, 2019

(30) Foreign Application Priority Data
Sep. 22, 2017  (CN) .......................... 201710866564.7

(51) Int. Cl.
| G02F 1/1333 | (2006.01) |
| G02F 1/1335 | (2006.01) |
| G02F 1/1362 | (2006.01) |
| G02F 1/1339 | (2006.01) |

(52) U.S. Cl.
CPC ........ G02F 1/13338 (2013.01); G02F 1/1362 (2013.01); G02F 1/13394 (2013.01); G02F 1/133514 (2013.01); G02F 1/133394 (2021.01)

(58) Field of Classification Search
CPC ................................................. G02F 1/133394
See application file for complete search history.

(56) References Cited

U.S. PATENT DOCUMENTS

2015/0261367 A1*  9/2015  Zhang ................... G06F 3/0412
                                                              345/173

* cited by examiner

*Primary Examiner* — James A Dudek
(74) *Attorney, Agent, or Firm* — Dilworth & Barrese, LLP.; Michael J. Musella, Esq.

(57) ABSTRACT

A fabrication method of a display panel, a display panel and a display device are provided. The method includes: forming a piezoelectric sensing layer on a first substrate; forming a surface acoustic wave driver to excite a surface acoustic wave on the piezoelectric sensing layer; forming a passivation layer on the piezoelectric sensing layer where the surface acoustic wave driver has been formed; forming grooves in the passivation layer; dropping polymer material into the passivation layer; driving the polymer material into the grooves by the surface acoustic wave; performing a first curing, so that the polymer material is fixedly connected with the grooves; and cell-assembling the first substrate and a second substrate.

15 Claims, 4 Drawing Sheets

DISPLAY PANEL, FABRICATION METHOD THEREOF AND DISPLAY DEVICE

CROSS REFERENCE TO RELATED APPLICATIONS

The present application entitled "a display panel, a fabrication method thereof and a display device" claims priority of Chinese Patent Application No. 201710866564.7 filed on Sep. 22, 2017 to SIPO, the disclosure of which is incorporated herein by reference in its entirety as part of the present application.

TECHNICAL FIELD

Embodiments of the present disclosure relate to a display panel, a fabrication method thereof and a display device.

BACKGROUND

A liquid crystal display (LCD) has become a main product in the market due to its excellent performance and mature technology. A display panel is a main component in the liquid crystal display, which includes a plurality of pixel units and is cell-assembled by a color filter substrate and an array substrate, and liquid crystals are filled between the color filter substrate and the array substrate, so as to form a liquid crystal cell.

SUMMARY

Embodiments of the present disclosure provide a display panel, a fabrication method thereof and a display device.

At least one embodiment of the present disclosure provides a fabrication method of a display panel, comprising: forming a piezoelectric sensing layer on a first substrate; forming a surface acoustic wave driver on the piezoelectric sensing layer, the surface acoustic wave driver being used to excite a surface acoustic wave, and the surface acoustic wave propagating along the piezoelectric sensing layer; forming a passivation layer on the piezoelectric sensing layer where the surface acoustic wave driver has been formed; forming grooves in the passivation layer; dropping polymer material into the passivation layer; driving the polymer material into the grooves by the surface acoustic wave; performing a first curing, so that the polymer material is fixedly connected with the grooves; and cell-assembling the first substrate and a second substrate.

For example, performing a second curing, so that the polymer material is fixedly connected with the second substrate.

For example, the surface acoustic wave driver is an interdigital electrode.

For example, a reflective electrode is further formed on the piezoelectric sensing layer to reflect the surface acoustic wave to propagate toward the polymer material.

For example, the forming of the surface acoustic wave driver on the piezoelectric sensing layer comprises: forming an ITO electrode layer on the piezoelectric sensing layer; and patterning the ITO electrode layer to form the surface acoustic wave driver.

For example, before forming the piezoelectric sensing layer, forming a dielectric layer on the first substrate.

For example, after forming the grooves and before dropping the polymer material, forming an alignment film on the passivation layer.

At least one embodiment of the present disclosure also provides a display panel, comprising: a first substrate; a piezoelectric sensing layer provided on the first substrate; a surface acoustic wave driver provided on the piezoelectric sensing layer and configured to excite a surface acoustic wave, the surface acoustic wave propagating along the piezoelectric sensing layer; a passivation layer provided on the piezoelectric sensing layer where the surface acoustic wave driver has been provided; grooves provided in the passivation layer; polymer material provided and cured in the grooves, the polymer material being driven into the grooves by the surface acoustic wave; and a second substrate cell-assembled with the first substrate.

For example, the first substrate is a color filter substrate, and the second substrate is an array substrate; or the first substrate is an array substrate, and the second substrate is a color filter substrate.

For example, the surface acoustic wave driver is an interdigital electrode.

For example, a reflective electrode is further provided on the piezoelectric sensing layer, the reflective electrode being configured to reflect the surface acoustic wave to propagate toward the polymer material.

For example, the surface acoustic wave driver comprises ITO material.

For example, the display panel further comprises a dielectric layer, the dielectric layer being located between the first substrate and the piezoelectric sensing layer.

For example, the display panel further comprises an alignment film, the alignment film being provided between the passivation layer and the polymer material.

At least one embodiment of the present disclosure also provides a display device comprising the display panel.

BRIEF DESCRIPTION OF THE DRAWINGS

Embodiments of the present disclosure will be described in more detail below with reference to accompanying drawings to allow an ordinary skill in the art to more clearly understand embodiments of the present disclosure, in which.

DETAILED DESCRIPTION

Technical solutions of the embodiments will be described in a clearly and fully understandable way in connection with the drawings related to the embodiments of the disclosure. It is apparent that the described embodiments are just a part but not all of the embodiments of the disclosure. Based on the described embodiments herein, those skilled in the art can obtain other embodiment(s), without any creative work, which shall be within the scope of the disclosure.

Unless otherwise defined, all the technical and scientific terms used herein have the same meanings as commonly understood by one of ordinary skill in the art to which the present disclosure belongs. The terms, such as "first," "second," or the like, which are used in the description and the claims of the present disclosure, are not intended to indicate any sequence, amount or importance, but for distinguishing various components. The terms, such as "comprise/comprising," "include/including," or the like are intended to specify that the elements or the objects stated before these terms encompass the elements or the objects and equivalents thereof listed after these terms, but not preclude other elements or objects. The terms, "on," "under," or the like are only used to indicate relative position relationship, and when the position of the object which is described is changed, the relative position relationship may be changed accordingly.

Inventors noticed that a plurality of spacers distributed evenly are arranged on a color filter substrate or an array substrate to maintain a thickness of a cell between the color filter substrate and the array substrate in a liquid crystal display panel, and keep a thickness of a liquid crystal layer between color filter substrate and the array substrate even and stable. With development of a flexible liquid crystal display technology, requirements on the spacers are higher and higher, and generally, a supporting wall is formed by a photolithography with mask, for replacing resin powder particles in an original liquid crystal cell and supporting the thickness of the cell. However, in the method of forming the supporting wall by the photolithography with mask, accuracy of positioning the supporting wall is not high, and the supporting wall is only in simple physical contact with another substrate during cell-assembling, in which relative displacement happens easily to result in the light leakage. For example, the bending of a flexible display panel will introduce an abnormal gap between liquid crystal units to result in a change in optical characteristics of a liquid crystal layer, which leads to poor display, such as decreasing in contrast.

Figure 1:
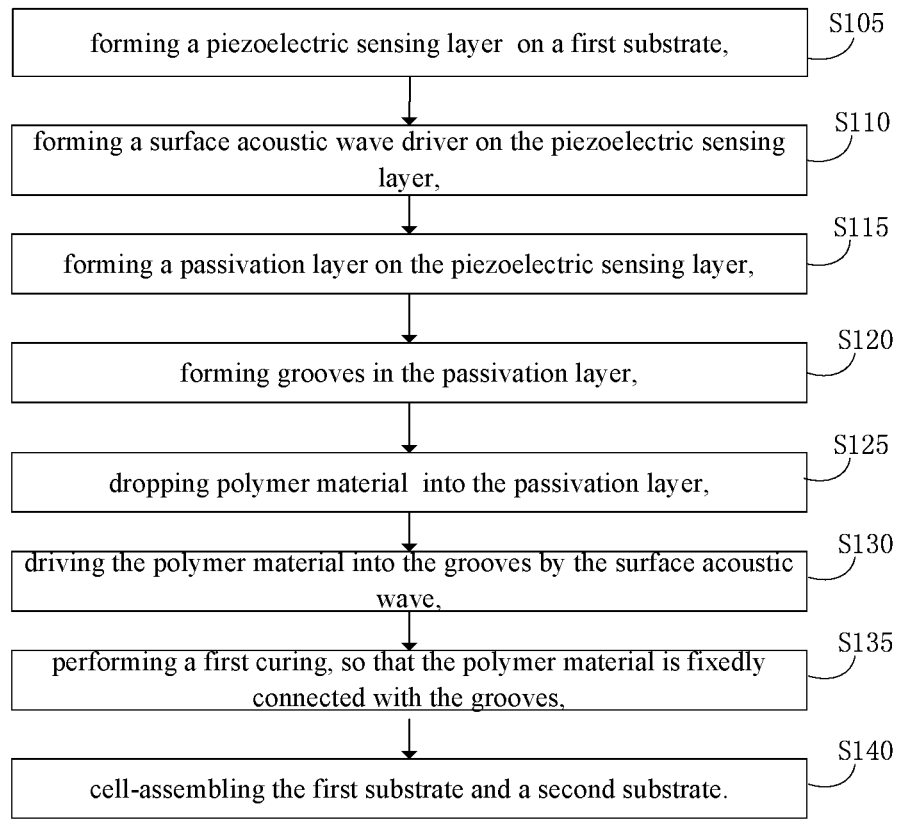
FIG. 1 shows a flow chart of fabricating a display panel according to an embodiment of the present disclosure.

As shown in FIG. 1, one embodiment of the present disclosure provides a fabrication method of a display panel, and the method comprises following operations.

S105: forming a piezoelectric sensing layer 20 on a first substrate 10.

In the example, the first substrate is an array substrate, and the second substrate is a color filter substrate.

Figure 2:
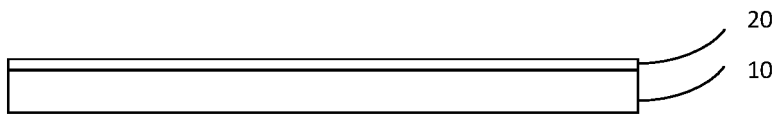
FIG. 2 shows a schematic diagram of forming a piezoelectric sensing layer on a first substrate according to an embodiment of the present disclosure.

As shown in FIG. 2, a Zinc oxide (ZnO) thin film is deposited on the first substrate 10 as the piezoelectric sensing layer 20 by using a chemical vapor deposition (CVD) process. The ZnO thin film has a thickness of about 1000 Å.

It should be noted that, in the embodiment of the present disclosure, the piezoelectric sensing material is not limited to ZnO, and the piezoelectric sensing layer may also be formed by other piezoelectric materials, such as Zinc Sulphur (ZnS), Aluminium Nitride (AlN), or the like.

S110: forming a surface acoustic wave driver on the piezoelectric sensing layer 20 to excite a surface acoustic wave, and the acoustic surface wave propagates along the piezoelectric sensing layer.

In one example, a surface acoustic wave driver is formed on the piezoelectric sensing layer, and the surface acoustic wave driver is an interdigital electrode 31.

Figure 3:
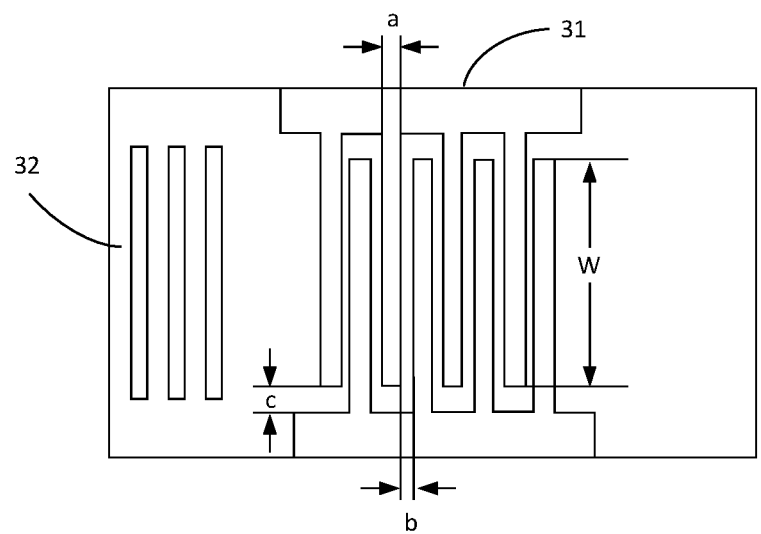
FIG. 3 shows a top view of a structure of a surface acoustic wave driver according to an embodiment of the present disclosure.
Figure 4:
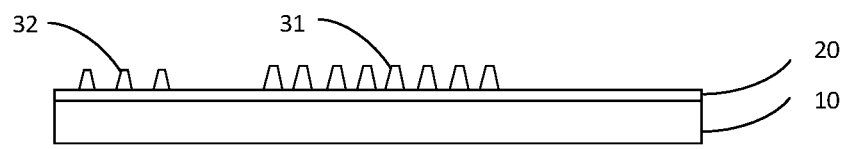
FIG. 4 shows a cross-sectional view of the structure of the surface acoustic wave driver according to the embodiment of the present disclosure.

As shown in FIG. 3 and FIG. 4, in the interdigital electrode 31, metal finger strips intersected with each other refer to fingers, and W represents a length of a portion where two adjacent fingers overlap with each other, which refers to finger length, and a surface acoustic wave is generated in the range of this length, and this length determines a width of a beam of the emitted surface acoustic waves. a is a finger width, b is a finger gap, and two fingers and two gaps form a pair of fingers, which is a minimum unit of the interdigital electrode. Generally, the finger width and the finger gap are same, and parameters affecting working index of an interdigital transducer include a center frequency f, a number of interdigital pairs N, a finger length W, and shape of the finger of the interdigital transducer.

In the example, for example, the finger width a of the interdigital electrode is about 5 micrometers, the finger interval b is about 5 micrometers, the finger length W is about 50 micrometers, and a distance c from a fingertip to another electrode is about 5 micrometers. By designing the shape, the number of finger pairs and the finger length of the interdigital electrode, a surface acoustic wave having a desired intensity can be obtained.

In another example, a reflective electrode 32 is also formed on the piezoelectric sensing layer, to reflect the surface acoustic wave to propagate toward polymer material, and the reflective electrode has a plurality of stripe-shaped structures arranged in parallel substantially. In the example, for example, three parallel stripe-shaped structures are used, however, the embodiment of the present disclosure is not limited thereto.

By introducing the reflective electrode, a surface acoustic wave propagates in a direction away from the polymer material is reflected, which can avoid the loss of the surface acoustic wave so as to reduce power consumption.

In the above-described example, a method of forming an interdigital electrode or simultaneously forming an interdigital electrode and a reflective electrode on the piezoelectric sensing layer includes following operations.

Depositing an Indium Tin Oxide (ITO) electrode layer on the piezoelectric sensing layer.

Coating a layer of photoresist on the ITO electrode layer.

Acquiring a patterned ITO electrode by photolithgraphy, exposing, developing, etching and stripping. The ITO electrode is an interdigital electrode, or the ITO electrode includes an interdigital electrode and a reflective electrode corresponding thereto.

The exposing process in the embodiment of the present disclosure is same as the exposing process in the art, including coating a photoresist layer, selectively exposing through a mask, developing, and forming a photoresist pattern same as a mask pattern on a substrate, etching, cleaning and other processes, which will not be repeated in detail herein.

In the present example, the ITO electrode layer has a thickness of, for example, about 0.5 μm. It should be noted that, in the foregoing patterning process, the photoresist may be a positive photoresist or a negative photoresist, and the required mask also corresponds to the used positive or negative photoresist.

S115: forming a passivation layer (PVX) 40 on the piezoelectric sensing layer where the above structure has been formed thereon.

Figure 5:
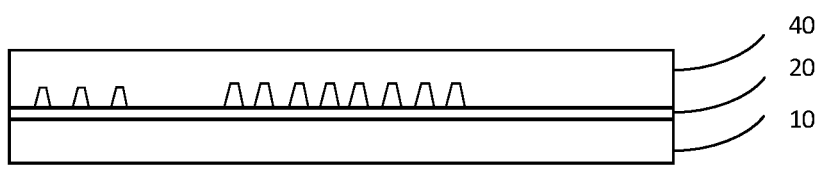
FIG. 5 shows a schematic diagram of forming a passivation layer on the piezoelectric sensing layer where the surface acoustic wave driver has been formed according to the embodiment of the present disclosure.

As shown in FIG. 5, the piezoelectric sensing layer is packaged by PVX SiNx, to form a passivation layer 40 on the piezoelectric sensing layer, and the passivation layer can protect the surface acoustic wave driver.

S120: forming grooves 50 in the passivation layer 40, for example, the grooves 50 are located at an upper portion of the surface acoustic wave driver.

Figure 6:
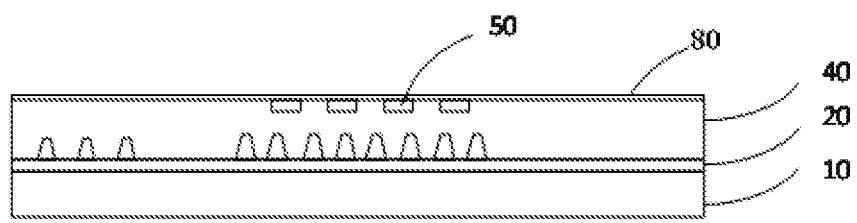
FIG. 6 shows a cross-sectional view of forming grooves in the passivation layer according to the embodiment of the present disclosure.
Figure 7:
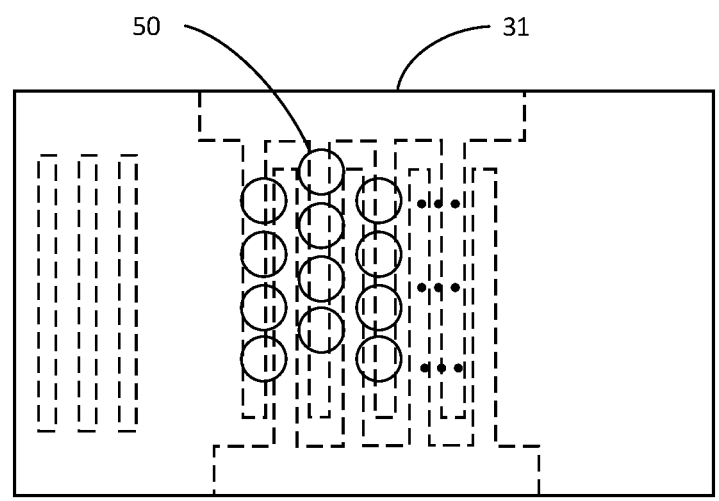
FIG. 7 shows a top view of forming the grooves in the passivation layer according to the embodiment of the present disclosure.

As shown in FIGS. 6 and 7, the grooves 50 are formed in the passivation layer 40, and a position of the grooves 50 are used to form a supporting wall for supporting the color filter substrate.

The method for forming the groove 50 includes following operations.

Coating a layer of photoresist on the passivation layer.

The groove structure is acquired by photolithography, exposing, developing, etching and stripping. For example, the groove has a depth less than that of the passivation layer, i.e., each of the grooves does not penetrate through the passivation layer.

It should be noted that the interdigital electrode 31 in some figures is not visible on an upper surface of the substrate due to the passivation layer 40 interposed therebetween, in FIG. 7, to illustrate positional relationship between the interdigital electrode 31 and the grooves 50, the interdigital electrode 31 including a plurality of fingers is shown by dotted lines.

S125: Dropping polymer material 60 into the passivation layer.

Polymer material is dropped into the passivation layer having the grooves, and in the example, the polymer material is, for example, a photosensitive resin polymer.

S130: driving the polymer material into the grooves by the surface acoustic wave.

Figure 8:
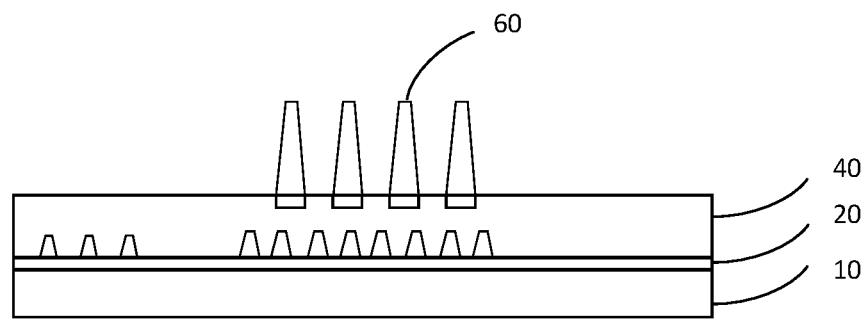
FIG. 8 shows a schematic diagram of driving polymer material into the grooves by the surface acoustic wave according to the embodiment of the present disclosure.

As shown in FIG. 8, in the example, the interdigital electrode is used as a surface acoustic wave driver, to acquire an electrical signal through a circuit in a display panel structure, and the electrical signal is used to excite a surface acoustic wave, the excited surface acoustic wave propagates along the piezoelectric sensing layer, to drive the polymer material 60 into the grooves 50.

It should be understood that high-frequency electrical signal may be converted into high-frequency acoustic signal through the interdigital electrode, and the high-frequency acoustic signal is coupled into a photosensitive resin droplet, which may allow acoustic lines to be generated in the droplets more quickly, and drive the photosensitive resin into the grooves.

In the example, the interdigital electrode may convert an electrical signal into an upper surface wave, and a desired 26.5 MHz sine wave carrier signal is generated by an application-specific integrated circuit (IC), the IC is integrated on a flexible circuit board and is connected with the interdigital electrode by bonding. The surface acoustic wave driver is turned on and off by the IC, and a turn-on voltage is 10 V. After the photosensitive resin enters the grooves, the photosensitive resin is pre-cured by an ultraviolet (UV) light, so that the polymer material is fixedly connected with the grooves to form a polymer supporting wall structure.

It should be understood that, in the example, the sine wave carrier signal may be generated by an FPGA or an application-specific IC, and a driving signal for controlling the surface acoustic wave driver is turned off after a display signal is accessed, which would not affect display of the display panel.

S135: performing a first curing, so that the polymer material is fixedly connected with the grooves.

For example, after the photosensitive resin enters the grooves, the photosensitive resin is pre-cured by a UV light, so that the polymer material is fixedly connected with the grooves to form a polymer supporting wall structure.

S140: cell-assembling the first substrate and a second substrate.

Figure 9:
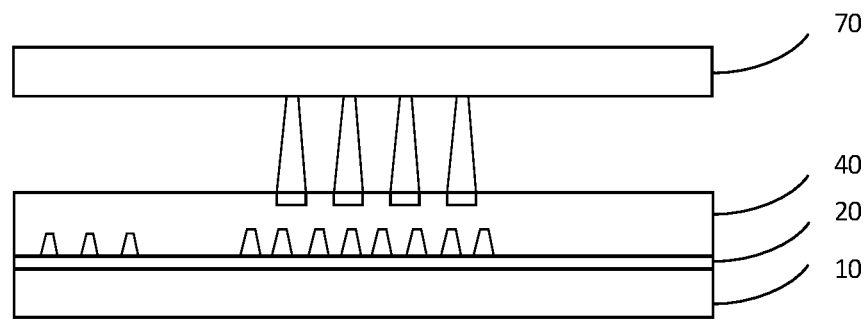
FIG. 9 shows a structural schematic diagram of a display panel according to an embodiment of the present disclosure.

As shown in FIG. 9, a display panel is formed by cell-assembling the first substrate 10 and the second substrate 70. In the example, the surface acoustic wave driver is formed based on a semiconductor technique, and the forming process is simplified. The surface acoustic wave driver may acquire an electrical signal through a circuit structure of the display panel and convert the electrical signal into a surface acoustic wave, which is compatible with a LCD technique, and may be fabricated on a basis of an array and cell-assembling is performed by one drop filling (ODF) process, while the display panel structure is miniaturized.

In yet another example, the method further comprises: before forming the piezoelectric sensing layer, forming a dielectric material layer on the first substrate. The dielectric material is a low dielectric constant material, and fluorinated silicon dioxide (SiOF) dielectric material is selected in the example.

By forming the dielectric material layer on the first substrate, parasitic capacitance may be avoided and its effect on the thin film transistor(s) in the display panel may be eliminated.

In yet another example, the method further comprises forming an alignment film 80 on the passivation layer before dropping the polymer material and after forming the grooves.

In the art, a polymer supporting wall is formed by a photoetching mask technology, and an APR transferring process is performed on the supporting wall to form an alignment film. Since the supporting wall has a certain thickness, there is a possibility that a complete alignment film is not formed near the bottom of the supporting wall. In the present example, an alignment film is formed on the passivation layer where the grooves have been formed by the APR transferring process, which can avoid effect of the supporting wall on the alignment film, and allow uniform distribution of the alignment film to be formed.

In yet another example, the method further comprises following operations.

Figure 10:
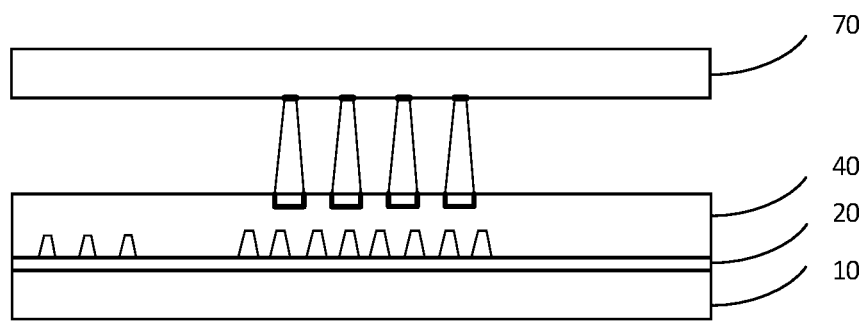
FIG. 10 shows a structural schematic diagram of a display panel according to another embodiment of the present disclosure.

As shown in FIG. 10, an ultraviolet (UV) curing is performed, so that the polymer material is fixedly connected with the color filter substrate.

In the fabrication method of the display panel in the present embodiment, the polymer material is fixedly connected with the grooves by a UV pre-curing process, and the polymer material is further fixedly connected with a second substrate by a further UV curing process, so that the polymer supporting wall is fixed with the array substrate and the color filter substrate, and light leakage due to relative displacement between the supporting wall and the substrate is decreased.

It should be noted that the UV curing process may be other types of thermal curing processes.

It should be understood that, the supporting wall may not be a standard columnar structure. In the embodiment of the present disclosure, a cross-sectional area of the top end of the supporting wall is generally less than a cross-sectional area of the bottom end of the supporting wall, where the bottom end is an end of the supporting wall in contact with the array substrate, and the shape of the cross section of the supporting wall may be any shape, such as circle, rectangle, or triangle, but the embodiment of the present disclosure is not limited thereto.

For example, the supporting wall may be disposed in a position corresponding to a black matrix formed on the array substrate, but the embodiment of the present disclosure is not limited thereto. That is, the orthographic projection of the supporting wall on the array substrate may fall within the orthographic projection black matrix on the array substrate The array substrate in the embodiment of the present disclosure may be a flexible substrate, for example, a plastic substrate, but the embodiment of the present disclosure is not limited thereto. It should be noted that the array substrate may also be other bendable substrates, such as a bendable glass substrate, but the embodiment of the present disclosure is not limited thereto.

In the above embodiment, by driving the polymer material into the grooves through the surface acoustic wave, self-alignment of the polymer supporting wall is realized, and accuracy of positioning the polymer supporting wall is improved; by forming the piezoelectric sensing layer and the surface acoustic wave driver sequentially on the first substrate, generation and propagation of the surface acoustic wave is realized on a surface of the first substrate without introducing an external surface acoustic wave signal, and the method is compatible with a LCD technology.

It should be noted that the first substrate may be a color filter substrate or an array substrate, and the second substrate may be an array substrate or a color filter substrate. When the first substrate is a color filter substrate, the second substrate is an array substrate; conversely, when the first substrate is an array substrate, the second substrate is a color filter substrate.

In yet another embodiment, the embodiment of the present disclosure provides a display panel. As shown in FIG. 10, the display panel comprises a first substrate 10, a second substrate 70 cell-assembled with the first substrate 10, and a supporting structure disposed in the first substrate and the second substrate. The supporting structure includes: a piezoelectric sensing layer 20 disposed on the first substrate; a surface acoustic wave driver disposed on the piezoelectric sensing layer to excite a surface acoustic wave, the surface acoustic wave propagating along the piezoelectric sensing layer; a passivation layer 40 disposed on the piezoelectric sensing layer; grooves disposed in the passivation layer; and a cured polymer material disposed in the grooves, the polymer material being driven into the groove by a surface acoustic wave.

In the display panel in the embodiment of the present disclosure, the polymer material is driven into the grooves by the surface acoustic wave, so that self-alignment of the polymer supporting wall is realized, and accuracy of positioning the polymer supporting wall is improved.

In yet another embodiment, based on a same concept, the embodiment of the present disclosure provides a display device, comprising the display panel provided by any embodiment of the present disclosure. The display device may be applied to any product or component having display function, such as a mobile phone, a tablet computer, a television, a monitor, a notebook computer, a digital photo frame, a navigator or the like. The principle of the device to solve the problem is similar to that of the display panel, the embodiment of the display panel can be referred to for the embodiment of the display device, which will not be repeated here.

Although the above method is illustrated and described as a series of actions for simplicity of explanation, it should be understood and appreciated that these methods are not limited by sequence of operations or actions, some operations or actions may be performed in different sequence in accordance with one or more embodiments, and/or concurrently performed with other operations or actions from the illustrations and descriptions herein or that are not illustrated and described herein but would be understood by a person of skill in the art.

It should be noted that the products in the embodiments of the present disclosure may be implemented by all technical solutions in the embodiments of the method, and the implementation process can refer to the related description in the foregoing examples, which will not be repeated herein.

The described above are only exemplary embodiments of the present disclosure, and the present disclosure is not intended to be limited thereto. For a person of ordinary skill in the art, various changes and alternations may be made without departing from the technical scope of the present disclosure, and all of these changes and alternations shall fall within the scope of the present disclosure.

What is claimed is:

1. A fabrication method of a display panel, comprising:
    forming a piezoelectric sensing layer on a first substrate;
    forming a surface acoustic wave driver on the piezoelectric sensing layer, the surface acoustic wave driver being used to excite a surface acoustic wave, and the surface acoustic wave propagating along the piezoelectric sensing layer;
    forming a passivation layer on the piezoelectric sensing layer where the surface acoustic wave driver has been formed;
    forming grooves in the passivation layer;
    dropping polymer material into the passivation layer;
    driving the polymer material into the grooves by the surface acoustic wave;
    performing a first curing, so that the polymer material is fixedly connected with the grooves; and cell-assembling the first substrate and a second substrate.

2. The fabrication method of the display panel according to claim 1, further comprising:
    performing a second curing, so that the polymer material is fixedly connected with the second substrate.

3. The fabrication method of the display panel according to claim 1, wherein the surface acoustic wave driver is an interdigital electrode.

4. The fabrication method of the display panel according to claim 3, wherein a reflective electrode is further formed on the piezoelectric sensing layer to reflect the surface acoustic wave to propagate toward the polymer material.

5. The fabrication method of the display panel according to claim 1, wherein the forming of the surface acoustic wave driver on the piezoelectric sensing layer comprises:
    forming an ITO electrode layer on the piezoelectric sensing layer; and
    patterning the ITO electrode layer to form the surface acoustic wave driver.

6. The fabrication method of the display panel according to claim 1, further comprising:
    forming a dielectric layer on the first substrate, before forming the piezoelectric sensing layer.

7. The fabrication method of the display panel according to claim 1, further comprising:

forming an alignment film on the passivation layer before dropping the polymer material and after forming the grooves.

8. A display panel, comprising
a first substrate,
- a piezoelectric sensing layer provided on the first substrate;
- a surface acoustic wave driver provided on the piezoelectric sensing layer and configured to excite a surface acoustic wave, the surface acoustic wave propagating along the piezoelectric sensing layer;
- a passivation layer provided on the piezoelectric sensing layer where the surface acoustic wave driver has been provided;
- grooves provided in the passivation layer;
- polymer material provided and cured in the grooves, the polymer material being driven into the grooves by the surface acoustic wave; and
- a second substrate cell-assembled with the first substrate.

9. The display panel according to claim 8, wherein
the first substrate is a color filter substrate, and the second substrate is an array substrate; or
the first substrate is an array substrate, and the second substrate is a color filter substrate.

10. The display panel according to claim 8, wherein the surface acoustic wave driver is an interdigital electrode.

11. The display panel according to claim 10, wherein a reflective electrode is further provided on the piezoelectric sensing layer, the reflective electrode being configured to reflect the surface acoustic wave to propagate toward the polymer material.

12. The display panel according to claim 8, wherein the surface acoustic wave driver comprises ITO material.

13. The display panel according to claim 8, further comprising:
- a dielectric layer, the dielectric layer being located between the first substrate and the piezoelectric sensing layer.

14. The display panel according to claim 8, further comprising:
- an alignment film, the alignment film being provided between the passivation layer and the polymer material.

15. A display device comprising the display panel according to claim 8.

* * * * *